United States Patent Office 3,404,952
Patented Oct. 8, 1968

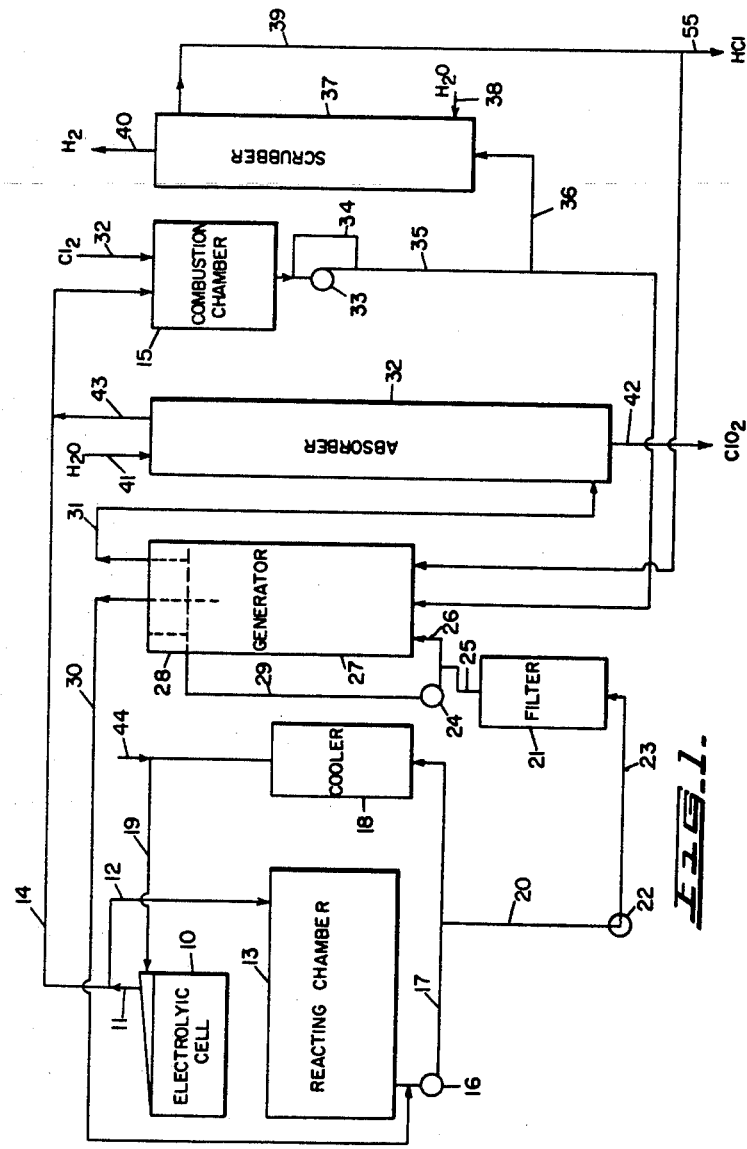

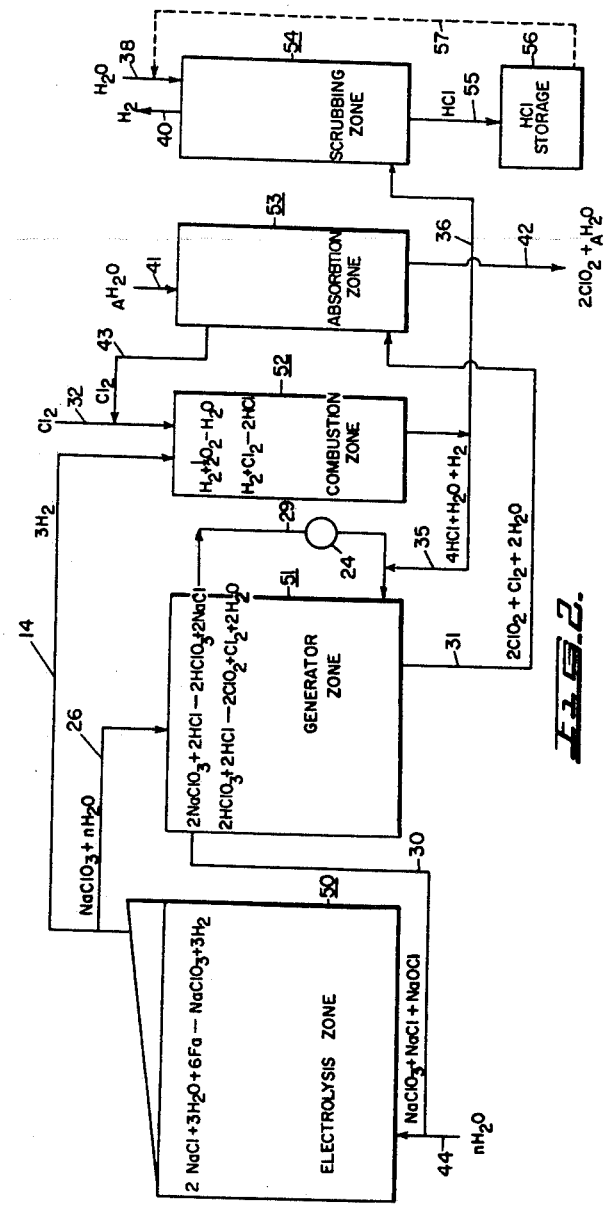

3,404,952
PROCESS FOR THE PREPARATION OF
CHLORINE DIOXIDE
Göthe O. Westerlund, Vancouver, British Columbia,
Canada, assignor to Chemech Engineering Ltd., Vancouver, British Columbia, Canada
Filed June 20, 1966, Ser. No. 558,997
14 Claims. (Cl. 23—152)

This invention relates to the production of chlorine dioxide, and more particularly to an improved process and apparatus for producing chlorine dioxide continuously and rapidly with high yields.

Chlorine dioxide has been prepared by treating chlorates with sulphuric acid or with mixtures of sulphuric acid and an organic reducing agent such as oxalic acid. These processes are, in general, uneconomical, hazardous and wasteful.

For example, Harry N. Tatomer's process of producing chlorine dioxide, Canadian Patent No. 452,351, issued Nov. 2, 1948, employs chlorate solution, sulphuric acid and chloride solution and generates at least one mole of chlorine for every two moles of chlorine dioxide. The effluent liquor is rich in chemicals which go to waste unless expensive recovery equipment such as evaporators and crystallizers are employed.

Processes using a metallic chlorate and mixtures of a strong mineral acid and reducing agents such as sulfur dioxide, chromic acid, nitrogen peroxide, alcohols and aldehyde yield chlorine dioxide with lower chlorine concentrations. However, the efficiency or yield of chlorine dioxide is not as high and the reagents are more expensive. Canadian Patent No. 533,803, issued Nov. 27, 1956, to Francis H. Dole uses sulphur dioxide in a mixture of a sulphuric acid and sodium chlorate solution. Another example is Henry C. Marks, et al., U.S. Patent No. 2,616,792, issued Apr. 1, 1949, which uses an excess of nitrogen peroxide on chlorate solution. Still another example is S. H. Persson's Canadian Patent No. 438,316, issued Dec. 3, 1946, uses chromic sulphate on an acidified chlorate solution. Finally, Max L. Audoynaud's Canadian Patent No. 512,954, issued May 17, 1955, produces a chlorine dioxide by blowing air or inert gas through a porous member into an acid solution of chlorate.

It is also well known that hydrochloric acid and chloric acid may be reacted to produce gaseous mixtures of chlorine dioxide and chlorine. In practice these reactions are carried out by treating aqueous mixtures of water-soluble chlorates and chlorides, such as may be obtained for example by chlorinating lime or by the electrolysis of salt, with an excess of a strong inorganic acid, such as hydrochloric acid or sulphuric acid. The following equations represent these reactions:

(1) $2NaClO_3 + 4HCl = 2ClO_2 + Cl_2 + 2NaCl + 2H_2O$ (2) $2NaClO_3 + 12HCl = 6Cl_2 + 2NaCl + 6H_2O$

Ordinarily, reaction (2) is predominant over reaction (1) and the yield in chlorine dioxide is correspondingly low.

To minimize reaction (2) it has been suggested to react properly proportioned mixtures of chlorates, chlorides and a strong inorganic acid in dilute solutions (containing at least 50% and preferably up to 75% of water) at temperatures below 60° C. Based on reaction (1), equivalent ratios of $Cl^-/ClO_3^- = 2$ and of $$H^+/ClO_3^- = 2$$

should give high yields of $ClO_2$ per mol of chlorate decomposed. But in practice it has been proposed in particular to use a ratio of $H^+/ClO_3^-$ in excess of 2 because reaction (2) uses some of the chlorate in production of chlorine instead of $ClO_2$. This proposal results in the use of excessive quantities of acid.

Furthermore, it has been recognized that a high yield of $ClO_2$ per mol of chlorate decomposed, while desirable, is not alone sufficient to make the process economical for large scale production of chlorine dioxide. As a matter of practical necessity, it has therefore been recommended that the decomposition of the chlorate initially present be carried substantially to completion to avoid any appreciable waste of this valuable raw material. However, the requirement of consuming all, or almost all, of the chlorate entails inherent difficulties which greatly decrease the efficiency, rapidity and therefore the economy of the older process. One difficulty is the fact that the average hourly output of $ClO_2$ is necessarily low because the reaction rate decreases considerably as the concentration of the reactants, particularly of chlorate, decreases. The use of solutions of low chlorate content further magnifies this effect and wastes valuable space in the reaction chamber. Finally, as the concentration of chlorate decreases, reaction (2) contributes increasingly to the decomposition of the chlorate whereby the overall yield of chlorine dioxide is lowered.

Another prior process involves reacting solutions of chlorates with hydrochloric acid, the acid being supplied in amount of substantially less than the equivalent stoichiometric ratio of $H^+/ClO_3^- = 2$ cf reaction (1), thereby decomposing at any one time only a fraction of the available chlorate, said decomposition thus proceeding at a particularly rapid rate; enriching the chlorate content of the partially spent solution, as for example by feeding it to an electrolytic chlorate cell, returning the fortified solution to the reaction chamber to treat it again with a stoichiometrically insufficient amount of acid; and repeating this cycle, whereby substantially all the chlorate supplied is eventually efficiently decomposed, producing mixtures of chlorine dioxide and chlorine containing high proportions of chlorine dioxide.

However, the process is generally unsatisfactory since it uses hydrochloric acid, which is considerably more expensive than chlorine and in remote areas is prohibitive because of transportation cost. Secondly, additional expensive equipment is necessary to produce the compressed air which is used as diluent for the chlorine dioxide and chlorine generator gases to reduce the inherent explosion hazard of the process.

Again, in the aforesaid process, external heat or steam is required to vaporize hydrogen chloride and to maintain desired reaction temperature in the gas-generators.

Finally, a minimum of one mole of chlorine is produced per two moles of chlorine dioxide-generated. Since the raw material is hydrochloric acid the chlorine is proiced from the purchased acid. This is a large economic penalty since the cost of the acid used as raw material normally is considerably higher than the equivalent cost of chlorine if purchased.

An object of one aspect of the present invention is the provision of a continuous recyclic process for the production of chlorine dioxide in which a minimum of raw materials is necessary to maintain the operation thereof.

An object of another aspect of the present invention is the provision of a continuous recyclic process for the preparation of chlorine dioxide in which a readily usable gaseous product is the major by-product of the process.

An object of yet another aspect of the present invention is the provision of a continuous recyclic process for the production of chlorine dioxide in which the system is self-contained in regard to heat.

An object of still another aspect of the present invention is the provision of a continuous recyclic process for the production of chlorine dioxide which is particularly suited for pulp mills producing bleached pulp.

An object of a still further aspect of the present invention is the provision of a continuous recyclic process for the production of chlorine dioxide which is simple in operation and easily controlled.

An object of a still further aspect of this invention is the provision of a continuous process for the production of chlorine dioxide using as part of the apparatus, electrolytic cells and operating them under conditions minimizing the current efficiency losses.

An object of another aspect of the present invention is the provision of an apparatus for the continuous production of chlorine dioxide.

By one broad aspect of the present invention, a continuous process is provided for the production of chlorine dioxide, which process comprises, (a) effecting electrolysis of an aqueous solution of a metal chloride whereby to form (i) an aqueous solution of a metal chlorate and (ii) gaseous hydrogen; (b) reacting the gaseous hydrogen (a)(ii) with gaseous chlorine whereby to form (iii) gaseous hydrogen chloride (c) reacting the aqueous solution of metal chlorate (a)(i) with the gaseous hydrogen chloride (b)(iii) whereby to form (iv) an aqueous solution of metal chloride, which is recycled to step (a) and (v) an aqueous solution of chloric acid and (d) reacting the aqueous solution of chloric acid (c)(v) with the gaseous hydrogen chloride (b)(iii) whereby to form (vi) chlorine dioxide, which is recovered (vii) water, which is preferably recycled to step (a) and (viii) gaseous chlorine which is recycled to step (b).

By another aspect of this invention apparatus is provided comprising: (a) an electrolytic cell; (b) means connecting said electrolytic cell with a reacting chamber; (c) a cooler; (d) means connecting the outlet of said reacting chamber through said cooling means to the inlet of said electrolytic cell; (e) a reaction vessel; (f) means connecting the outlet of said electrolytic cell to said reaction vessel; (g) means connecting the outlet of said reacting chamber to said reaction vessel; (h) a combustion chamber; (i) means connecting the outlet of said electrolytic cell to said combustion chamber; (j) means connecting the outlet of said combustion chamber with said reaction vessel; (k) an absorber; (l) means connecting an outlet of said reaction vessel to an outlet of said reacting chamber; (m) means connecting an outlet of said reaction vessel to said absorber; (n) inlet means to said absorber; (o) outlet means from said absorber; and (p) means connecting an outlet of said absorber with an inlet of said combustion chamber.

The present invention therefore provides a process for the manufacture of chlorine dioxide which is based on following main reactions: ($M$=metallic)

(1) $2MCl + 6H_2O + 12$ Faradays $\rightarrow 2MClO_3 + 6H_2$ (2) $2H_2 + 2Cl_2 \rightarrow 4HCl$ (3) $2MClO_3 + 2HCl \rightarrow 2MCl + 2HClO_3$ (4) $2HClO_3 + 2HCl \rightarrow 2ClO_2 + Cl_2 + 2H_2O$ The system is balanced as follows:

(5) $\underbrace{4H_2O + Cl_2 + 12 \text{ Faradays}}_{\text{Feed}} \longrightarrow \underbrace{2ClO_2 + 4H_2}_{\text{Discharge}}$ The action of hydrogen chloride on the metallic chlorate solution will produce chlorine dioxide and chlorine according to reactions (3) and (4). By controlling acidity and utilizing an excess of the metallic chlorate, reactions (3) and (4) can be caused to yield $ClO_2:Cl_2$ in ratio 2:1. Chlorine is consumed in reaction (2) for production of hydrogen chloride, thus, the system will yield chlorine dioxide only, free of chlorine to the extent of the efficiency of chlorine dioxide gas separator. Since the system is closed, after the initial charge of metallic chloride, no addition of salt is required. Furthermore, the electrolysis in reaction (1) will produce 3 times the required amount of hydrogen. The process of the present invention is thus based on a system which requires water, chlorine and electric current for the production of chlorine dioxide. Hydrogen is the only by-product.

The present invention is a completely closed system with no effluent liquor other than the output of chlorine dioxide solution. Therefore, losses of reagents are minimized and the manufacturing cost of chlorine dioxide will be determined by cost of power and chlorine. Thus, the system in the present invention is self-regenerating in regard to chemicals except for chlorine and water. At 100% yield, one mole of chlorine is required for production of two moles of chlorine dioxide. The only other raw material is electrical energy, the two moles of water per mole $ClO_2$ are insignificant.

Another feature of the present invention is that the process yields chlorine dioxide and the only by-product is hydrogen gas which may be burned in any boiler for its fuel value. Thus, there are no by-products to be stored or recovered.

Another feature of the present invention is that the process is self-contained in regard to heat in so far as it generates an excess of heat for the process in the combustion chamber:

$$\tfrac{1}{2}H_2 + \tfrac{1}{2}Cl_2 \rightarrow HCl + 1000 \text{ kcal./m.}^3 \text{ STP-gas}$$

Temperature in the $ClO_2$ generator is controlled by the heat content of gases from combustion chamber.

Operating at high temperatures in the chlorine dioxide generator results in a substantial water evaporation and heat loss. If the heat evolved from above combustion reaction and from gas compressor or blower is insufficient to maintain a desirable temperature in generator, part of the excess hydrogen can be combusted with air in the combustion chamber according to following combustion reaction:

$$H_2 + \tfrac{1}{2}O_2 \rightarrow H_2O + 2600 \text{ kcal./m.}^3 \text{ STP-gas}$$

Another feature of the present invention is that the process favors operating the electrolytic cells at a low pH. Thus, current efficiency losses by the decomposition of hypochlorite will be minimized and the chemical attack on graphite electrodes will be less severe. The chlorine losses to cell gases will be higher but the chlorine is subsequently combusted with hydrogen to form hydrogen chloride and thus benefits the production of chlorine dioxide.

Another feature of the present invention is that the process minimizes the dangers of explosion from chlorine dioxide by recirculating excess hydrogen in order to dilute the generated gases. Designing the system for short gas retention time and a large surface contact area, controlling temperature of gas mixture after generator and avoiding ultra violet light will eliminate hazards of explosions from chlorine and hydrogen.

In the accompanying drawings:

FIGURE 1 is a schematic diagrammatic representation of the process of the present invention, and FIGURE 2 is an idealized schematic representation of the chemical equations of the process of the present invention.

Turning first to FIGURE 1, an electrolytic cell 10, which may be that disclosed and claimed in pending Canadian application Ser. No. 901,153, filed Apr. 24, 1964, operates to electrolyze an aqueous solution of a metal chloride, for example sodium chloride, and the effluent leaves via line 11, from whence the liquid products proceed via line 12 to reacting chamber 13, and the gaseous products proceed via line 14 to a combustion chamber 15, whose purpose and function will be described hereinafter. The liquid is induced to react in the reaction chamber 13 and is recycled via pump 16 and line 17 through cooler 18 and line 19 to electrolytic cell 10.

A branch line 20 cycles part of the reaction products formed in the reacting chamber 13 through filter 21 through means of pump 22 and line 23. Filter liquid flow is by means of lines 25 and 26 to the bottom of a generator 27. A gas separation zone 28 separates gaseous product in generator 27 from liquid products, and the liquid products are recycled by means of pump 24 and line 29 to line 26 for reaction again in the generator. A portion of the liquid product is led via line 30 to the intake side of pump 16. From there, they may be recycled to cooler 18 and thence to electrolytic cell 10 for reconcentration, to filter 21 and thence to generator 27. The off-gases from generator 27 are fed via line 31 to the bottom of absorber 32.

The off-gases from electrolytic cell 10 pass via line 14 to combustion chamber 15 as stated hereinabove, where they are reacted with chlorine gas admitted via line 32. Hot gases from combustion chamber 15 are compressed via pump 33, pressure regulated through recirculation line 34 and fed via line 35 to the bottom of generator 27. A branch line 36 off line 35 leads to a water scrubber 37, where excess gases are scrubbed with water admitted through line 38. The effluent from scrubber 37 is passed via line 39 to the bottom of generator 27. Off-gases from scrubber 37 are vented via line 40.

As stated hereinbefore, exit gases from generator 27 are passed via line 31 to the bottom of absorber 32. Here they are absorbed by water admitted via line 42. Desired chlorine dioxide is recovered via line 42, while off-gases are passed via line 43 to line 14 and back to the combustion chamber 15.

Turning now to FIGURE 2, there is shown in idealized form, interconnected electrolysis zone 50, generator zone 51, combustion zone 52, absorption zone 53 and scrubbing zone 54. The electrolysis zone 50 where the reaction $$2[NaCl + 3H_2O + 6 \text{ Faradays} \rightarrow NaClO_3 + 3H_2]$$

(where the metal is sodium) takes place, may be considered to be coextensive with electrolytic cell 10, reacting chamber 13, cooling 18, and the associated interconnections shown in FIGURE 1.

The generator zone 51, where the reactions $$2NaClO_3 + 2HCl \rightarrow 2HClO_3 + 2NaCl$$

and $$2HClO_3 + 2HCl \rightarrow 2ClO_2 + Cl_2 + 2H_2O$$

(where the metal is sodium) takes place may be considered to be coextensive with the generator 27, the filter 21 and the associated interconnections shown in FIGURE 1. One of the reactants, i.e., aqueous sodium chlorate, for the reaction in the generation zone 51, is fed to the generation zone 51 from the electrolysis zone 50 via line 26 (as stated with reference to FIGURE 1) in the form of an aqueous solution (i.e. $NaClO_3 + nH_2O$). The other reactant, hydrogen chloride gas, for the reaction in the generation zone 51 is fed to the generation zone 51 via line 35 (as also shown in FIGURE 1) in the form of impure water wet gas (i.e. $4HCl + H_2O + H_2$). The liquid effluent (i.e. $NaClO_3 + NaCl + NaOCl$) from generation zone 51 passes via line 30 (as shown in FIG. 1) to be recycled to the electrolysis zone 50. Fresh water, with any additional reagents may also be added via line 44. The gaseous effluent (i.e. $2ClO_2 + Cl_2 + 2H_2O$) from generation zone 51 passes via line 31 (as also shown in FIGURE 1) to the absorption zone 53. A recirculation line 29 assures greater reaction volume in the generation zone and hence increases the efficiency of the process.

As stated hereinabove, the liquid effluent (i.e.

$$NaClO_3 + nH_2O)$$

passes from the electrolysis zone 50 to the generator zone 51 via line 26. The gaseous effluent (i.e. predominantly $3H_2$) is conducted via line 14 (as also shown in FIGURE 1) to combustion zone 52.

Combustion zone 52 may be considered as being coextensive with combustion chamber 15, pump 35 and the associated interconnections shown in FIGURE 1. In the combustion zone the following reactions take place $H_2 + \frac{1}{2} O_2 \rightarrow H_2O$ (to use up incidentally present oxygen and $H_2 + Cl \rightarrow 2HCl$.

Since the origin of the hydrogen and oxygen in the above equations has been explained, suffice to say that the chlorine for the reaction in the combustion zone 52 has two derivations: as freshly added chlorine gas via line 32 (as also shown in FIGURE 1) and as generated chlorine from the absorption zone 53 via line 43 (as also is shown in FIGURE 1). The sole effluent from the combustion zone, namely the hot exhaust gases (i.e.

$$4HCl + H_2O + H_2 +$$

a small amount of $CO_2$ from the electrolysis by-reaction) is fed primarily via line 35 (as also shown in FIG. 1) to the generation zone 51. A branch line 36 (as also shown in FIG. 1) conducts a bleed-off amount of such gaseous effluent to a scrubbing zone 54.

Absorption zone 53 (equivalent to absorber 32) is fed with effluent (namely $2ClO_2 + Cl_2 + 2H_2O$ and recycled dilution gases which are mainly hydrogen but also include a small amount of carbon dioxide) from generator zone 51 via line 31 (as also shown in FIGURE 1). Hence the gases are contacted with water, admitted via line 41 (as also shown in FIGURE 1) and the water soluble chlorine dioxide emerges as an aqueous solution via line 42 (as also shown in FIGURE 1), (i.e. as $2ClO_2 + nH_2O$). The unabsorbed gases, $Cl_2$ and recycled gases are led via line 43 (as also shown in FIGURE 1) to combustion zone 52.

The scrubber zone 54 (equivalent to scrubber 37) is provided to recover excess hydrogen chloride. The stream of gases ($4HCl + H_2O + H_2$) from combustion zone 52 led via line 36 to scrubbing zone 54 is contacted with water in that zone, admitted via line 38 (as also shown in FIGURE 1). Liquid effluent hydrochloric acid leaves via line 55 to a hydrochloric acid storage tank 56. If more concentrated hydrochloric acid is required the dilute acid may be recycled via line 57.

The process of the invention may thus be summarized in the following terms:

Chlorine is fed by a line 32 to the chamber 15 where the gas is combusted with the gaseous mixture from another feed line 14. The hot gases from combustion chamber 15 are compressed (33) and pressure regulated by means of a recirculating line 34. The compressed gas is fed to generator 27 by line 35 which has a branch line 36 for excess gases. These exit gases are scrubbed by scrubber 37 for hydrogen chlorine. The overflow hydrochloric acid is fed via line 39 to generator 27. Exit gases from scrubber 37 are mainly hydrogen. The amount of water fed to scrubber 37 via line 38 is regulated to maintain the desired volume of liquor in process system.

Hydrogen chloride gas and hydrochloric acid react in generator 27 with chlorate to produce chlorine dioxide and chlorine gases. The gases are separated from liquor by providing sufficient surface area 28 and enter absorber 32 where chlorine dioxide is dissolved in water and leaves the system via line 42 as a diluted solution partly contaminated with chlorine. The exit gas from absorber 32 contains most of the Cl$_2$ produced and the inert H$_2$ which is used for agitation in the reactor and as a diluting agent of the ClO$_2$ and Cl$_2$ for the purpose of eliminating the explosion hazard from concentrated ClO$_2$-gas. The gases are returned to chamber 15 for combustion via line 43.

The effluent liquor from generator 27 is returned to the electrolytic cell system via line 30. In cell units 10, hypochlorite and hypochlorous acid are produced and liquor is transferred via line 12 to a reacting chamber 13 for formation of chlorate. A recirculating pump (16) forces liquor through a cooler 18, for control of cell liquor temperature, and back to the cell units 10.

The gases produced in cell unit 10, mainly hydrogen, are fed via line 14 to the chamber 15 for combustion. Generator reagent liquor from reacting chamber 13 is pumped (22) through a filter 21 for removing solid particles and fed to generator 27 or to generator recirculating line 29.

Three experiments were carried out using the following apparatus:

(a) Purchased chlorine stored in tubes.
(b) Electrolytic chlorate system as described in Canadian Patent Application No. 901,153, filed April 24, 1964. The cell unit was designed for 1000 amps and 100 volt.
(c) a combustion chamber; a rectangular steel box tiled with acid resistant fire brick; volume=7.4 liter.
(d) Rotary positive gas pump, capacity up to 60 CFM.
(e) Chlorine dioxide generator;
9″ diameter and 59″ high packed glass column equipped with a recirculating system using a plastic pump with capacity up to 30 IGPM. The generator could be operated without recirculating pump and obtain recirculating by the gas lift in the generator.
(f) Chlorine dioxide gas absorber;
8″ diameter and 21′ high asbestos-cement tower packed with ½″ rasching rings.
(g) Exit gas scrubber;
3″ diameter and approx. 10′ high glass column.

Example 1

Operating generator at 50° C.
Generator liquor feed: 450 g.p.l. NaClO$_3$; effluent: 400 g.p.l. NaClO$_3$, 140 g.p.l. NaCl.
Electrolytic Cell: pH=6.0 temperature=35° C.

|  | Without Forced Circulating | With Forced Circulating |
|---|---|---|
| Chlorine Consumption, lbs./lb. ClO$_2$ | 0.65 | 0.64 |
| Power Consumption, KWH. (DC)/lb. ClO$_2$ | 4.00 | 3.90 |
| Chlorine in ClO$_2$ solution, lbs./lb. ClO$_2$ | 0.11 | 0.10 |

Example 2

Operating generator at 80° C. with same generator liquor as in No. 1 test and using forced circulating.

Chlorine consumption, lbs./lb. ClO$_2$ _____ 0.67
Power consumption kwh. (DC)/lb. ClO$_2$ _____ 3.80
Chlorine in ClO$_2$-solution, lbs./lb. ClO$_2$ _____ 0.14

Example 3

Operating generator at 50° C. using forced circulating.
Generator liquor feed: 600 g.p.l. NaClO$_3$; effluent 575 g.p.l. NaClO$_3$, 110 g.p.l. NaCl.

Chlorine consumption, lbs./lb. ClO$_2$ _____ 0.64
Power consumption kwh./lb. ClO$_2$ _____ 3.85
Chlorine in ClO$_2$-solution lbs./lb. ClO$_2$ _____ 0.10

Notes (1) Partial pressure of chlorine in generator gases=40 mm. Hg.
(2) All effluent liquor from hydrochloric acid scrubber was fed to generator.

I claim:
1. A continuous process for the production of chlorine dioxide which comprises:
   (a) effecting electrolysis of an aqueous solution of a metal chloride whereby to form
      (i) an aqueous solution of a metal chlorate, and
      (ii) gaseous hydrogen;
   (b) reacting the gaseous hydrogen (a)(ii) with gaseous chlorine whereby to form
      (iii) gaseous hydrogen chloride;
   (c) reacting the aqueous solution of metal chlorate (a)
      (i) with the gaseous hydrogen (b)(iii) whereby to form
      (iv) an aqueous solution of metal chloride, which is recycled to step (a), and
      (v) an aqueous solution of chloric acid, and
   (d) reacting the aqueous solution of chloric acid (c)(v) with the gaseous hydrogen chloride (b)(iii) whereby to form
      (vi) chlorine dioxide, which is recovered;
      (vii) water, and
      (viii) gaseous chlorine which is recycled to step (b).

2. A continuous process for the production of chlorine dioxide as claimed in claim 1 wherein the water which is formed in step (d)(vii) is recycled to step (a), and
   (d) reacting the aqueous solution of chloric acid (c)(v) with the gaseous hydrogen chloride (b)(viii) whereby to form the water formed in step (d)(vii) which is recycled to step (a).

3. The process of claim 1 wherein said metal is an alkali metal.

4. The process of claim 3 wherein said metal is sodium.

5. The process of claim 2 wherein said metal is an alkali metal.

6. The process of claim 5 wherein said metal is sodium.

7. A continuous process for the preparation of chlorine dioxide as claimed in claim 3 wherein:
   (e) the electrolysis of step (a) is effected in an electrolysis zone whereby to form
      (i) liquid products including an aqueous solution of a metal chlorate, and
      (ii) gaseous products including hydrogen; wherein
   (f) the gaseous products (a)(ii) are reacted with chlorine in a combustion zone, whereby to form
      (iii) water, and
      (iv) hydrogen chloride; wherein
   (g) the liquid products (e)(i) are reacted with the products (f)(iii) and (f)(iv) in a generator zone whereby to form
      (v) liquid products including an aqueous solution of metal chlorate, metal chloride and metal hypochloride, which latter is recycled to the electrolysis zone, and
      (vi) gaseous products including chlorine dioxide, chlorine and water; and wherein
   (h) the gaseous products (g)(vi) are passed though an absorption zone in contact with water, whereby
      (vii) chlorine dioxide is dissolved in the water and is recovered as effluent; and
      (viii) chlorine which is recycled to the combustion zone.

8. The process of claim 7 including the step, in step (g) of recycling a portion of the liquid products in a recirculation stream.

9. The process of claim 7 including the step of:

(i) contacting a portion of the gaseous effluent from the combustion zone in a scrubbing zone with water whereby
   (ix) hydrogen chloride is dissolved in the water and is recovered as aqueous hydrochloric acid effluent; and
   (x) hydrogen is vented off.

10. The process of claim 9 including the step of recycling the aqueous hydrochloric acid through the scrubbing zone.

11. The process of claim 7 wherein said metal is sodium.

12. The process of claim 8 wherein said metal is sodium.

13. The process of claim 9 wherein said metal is sodium.

14. The process of claim 10 wherein said metal is sodium.

References Cited

UNITED STATES PATENTS

| 1,905,432 | 4/1933 | Bauer | 23—156 |
| 2,317,443 | 4/1943 | Cunningham | 23—152 |
| 2,366,670 | 1/1945 | Maude | 23—156 |
| 2,484,402 | 10/1949 | Day et al. | 23—152 |
| 2,641,528 | 6/1953 | Audoynaud | 23—152 |
| 2,861,871 | 11/1958 | Germano | 23—152 |
| 2,863,722 | 12/1958 | Rapson | 23—152 |
| 3,341,287 | 9/1967 | Scribner | 23—152 |

FOREIGN PATENTS 674,808  7/1952  Great Britain.

OSCAR R. VERTIZ, *Primary Examiner.*

E. STERN, *Assistant Examiner.*